United States Patent [19]

Pike et al.

[11] Patent Number: 5,759,926

[45] Date of Patent: Jun. 2, 1998

[54] FINE DENIER FIBERS AND FABRICS MADE THEREFROM

[75] Inventors: Richard Daniel Pike, Norcross; Philip Anthony Sasse, Alpharetta, both of Ga.; Edward Jason White, Knoxville, Tenn.; Ty Jackson Stokes, Suwanee, Ga.

[73] Assignee: Kimberly-Clark Worldwide, Inc., Neenah, Wis.

[21] Appl. No.: 565,261

[22] Filed: Nov. 30, 1995

Related U.S. Application Data

[63] Continuation-in-part of Ser. No. 484,365, Jun. 7, 1995, abandoned.

[51] Int. Cl.$^6$ .......................... B29C 61/00; B29C 71/00; B29C 71/02; B32B 31/24

[52] U.S. Cl. .......................... 442/333; 156/83; 264/171.1; 264/211.14; 264/211.17; 264/230; 264/232; 264/234; 442/118; 442/119; 442/341; 442/346; 442/350; 442/381; 442/394; 442/401; 442/414; 442/415; 428/360; 428/361; 428/370; 428/374

[58] Field of Search .......................... 156/83; 264/171.1, 264/211.14, 230, 232, 234, 211.17; 428/360, 361, 370, 374, 397; 442/341, 350, 346, 381, 394

[56] References Cited

U.S. PATENT DOCUMENTS

| | | |
|---|---|---|
| 3,117,906 | 1/1964 | Tanner . |
| 3,323,978 | 6/1967 | Rasmussen . |
| 3,353,345 | 11/1967 | Setzer .......................... 57/140 |
| 3,382,305 | 5/1968 | Breen .......................... 264/171 |
| 3,388,547 | 6/1968 | Koga et al. .......................... 57/157 |
| 3,509,009 | 4/1970 | Hartmann . |
| 3,551,229 | 12/1970 | Yazawa .......................... 156/62.2 |
| 3,582,418 | 6/1971 | Schuur .......................... 156/83 |
| 3,589,956 | 6/1971 | Kranz .......................... 156/62.4 |
| 3,608,024 | 9/1971 | Yazawa .......................... 264/103 |
| 3,616,160 | 10/1971 | Wincklhofer et al. . |
| 3,620,892 | 11/1971 | Wincklhofer et al. . |
| 3,692,618 | 9/1972 | Dorschner et al. . |

(List continued on next page.)

FOREIGN PATENT DOCUMENTS

| | | |
|---|---|---|
| 730 055 | 3/1966 | Canada . |
| 0 090 397 | 10/1983 | European Pat. Off. . |
| 0 351 318 | 1/1990 | European Pat. Off. . |
| 0 380 358 | 8/1990 | European Pat. Off. . |
| 74 637 | 7/1970 | Germany . |
| 2 231 523 | 1/1974 | Germany . |
| 2 355 140 | 5/1974 | Germany . |
| 3605 165 | 8/1986 | Germany . |
| 49-132377 | 12/1974 | Japan . |
| 53-122875 | 10/1978 | Japan . |

(List continued on next page.)

OTHER PUBLICATIONS

V.A. Wente, et al., *Manufacture of Superfine Organic Fibers*, Naval Research Laboratory, Washington, D.C. NRL Rpt 4364, 111437, May 25, 1954.

K.D. Lawrence, et al., *An Improved Device For The Formation Of Superfine, Thermoplastic Fibers*, U.S. Naval Research Laboratory, Washington, D.C., NRL Rpt 5265, Feb. 11, 1959.

Polymers: Chemistry And Physics of Modern Material, pp. 145–145; by JMG Cowie, Int'l Textbook Co., Ltd. 1973.

*Primary Examiner*—James C. Cannon
*Attorney, Agent, or Firm*—William D. Herrick

[57] ABSTRACT

The present invention provides a splittable conjugate fiber containing at least two incompatible polymers that are arranged in distinct segments across the cross-section of the fiber, wherein the segments are continuous along the length of the fiber. The fiber can be characterized in that the segments of the fiber dissociate in less than about 30 seconds when contacted with a hot aqueous fibrillation-inducing medium. The invention also provides a fabric containing the split fibers produced from the precursor splittable conjugate fiber and laminates containing the split fiber fabric. Additionally provided is a process for producing the split fibers.

34 Claims, 2 Drawing Sheets

U.S. PATENT DOCUMENTS

| | | | |
|---|---|---|---|
| 3,802,817 | 4/1974 | Matsuki et al. | 425/66 |
| 3,849,241 | 11/1974 | Butin et al. | |
| 3,853,977 | 12/1974 | Matsui et al. | 264/103 |
| 3,876,459 | 4/1975 | Burrill. | |
| 3,917,448 | 11/1975 | Wood | 8/125 |
| 3,917,784 | 11/1975 | Nishida | 264/103 |
| 3,978,185 | 8/1976 | Buntin et al. | 264/93 |
| 4,038,452 | 7/1977 | Kobayashi et al. | 428/224 |
| 4,041,203 | 8/1977 | Brock et al. | 428/157 |
| 4,051,287 | 9/1977 | Hayashi et al. | 428/91 |
| 4,102,969 | 7/1978 | Neveu et al. | 264/147 |
| 4,118,534 | 10/1978 | Stanley | 428/370 |
| 4,163,078 | 7/1979 | Reinehr et al. | 428/373 |
| 4,239,720 | 12/1980 | Gerlach et al. | 264/147 |
| 4,257,999 | 3/1981 | Reinehr et al. | 264/203 |
| 4,288,484 | 9/1981 | Norota et al. | 428/113 |
| 4,298,649 | 11/1981 | Meitner | 428/198 |
| 4,340,563 | 7/1982 | Appel et al. | 264/518 |
| 4,361,609 | 11/1982 | Gerlach et al. | 428/90 |
| 4,369,156 | 1/1983 | Mathes et al. | 264/147 |
| 4,381,274 | 4/1983 | Kessler et al. | 264/147 |
| 4,381,335 | 4/1983 | Okamoto | 428/373 |
| 4,391,872 | 7/1983 | Suzuki et al. | 428/224 |
| 4,447,489 | 5/1984 | Linhart et al. | 428/225 |
| 4,460,649 | 7/1984 | Park et al. | 428/373 |
| 4,536,440 | 8/1985 | Berg | 428/284 |
| 4,547,420 | 10/1985 | Krueger et al. | 428/229 |
| 4,568,506 | 2/1986 | Kiriyama et al. | 264/171 |
| 4,714,647 | 12/1987 | Shipp, Jr. et al. | 428/212 |
| 4,753,843 | 6/1988 | Cook et al. | 428/286 |
| 4,767,825 | 8/1988 | Pazos et al. | 525/408 |
| 4,795,668 | 1/1989 | Krueger et al. | 428/174 |
| 4,810,449 | 3/1989 | Reinehr et al. | 264/182 |
| 4,814,131 | 3/1989 | Atlas | 264/147 |
| 4,824,451 | 4/1989 | Vogt et al. | 55/528 |
| 4,830,904 | 5/1989 | Gessner et al. | 428/219 |
| 4,923,454 | 5/1990 | Seymour et al. | 604/368 |
| 4,966,808 | 10/1990 | Kawano | 428/224 |
| 5,028,369 | 7/1991 | Reinehr et al. | 264/103 |
| 5,032,442 | 7/1991 | Yamazaki et al. | 428/105 |
| 5,033,172 | 7/1991 | Harrington | 28/107 |
| 5,045,387 | 9/1991 | Schmalz | 428/284 |
| 5,071,705 | 12/1991 | Tanaka et al. | 428/270 |
| 5,075,161 | 12/1991 | Nyssen et al. | 428/288 |
| 5,108,827 | 4/1992 | Gessner | 428/219 |
| 5,120,888 | 6/1992 | Nohr et al. | 524/99 |
| 5,143,786 | 9/1992 | Tanaka et al. | 428/357 |
| 5,188,895 | 2/1993 | Nishino et al. | 428/373 |
| 5,200,246 | 4/1993 | Sabee | 428/109 |
| 5,219,633 | 6/1993 | Sabee | 428/109 |
| 5,257,982 | 11/1993 | Cohen et al. | 604/378 |
| 5,275,884 | 1/1994 | Nishino et al. | 428/374 |
| 5,288,348 | 2/1994 | Modrak | 156/62.2 |
| 5,290,626 | 3/1994 | Nishio et al. | 428/224 |
| 5,310,514 | 5/1994 | Ruzek et al. | 264/103 |
| 5,369,858 | 12/1994 | Gilmore et al. | 28/104 |
| 5,372,885 | 12/1994 | Tabor et al. | 428/373 |
| 5,382,400 | 1/1995 | Pike et al. | 264/168 |
| 5,418,045 | 5/1995 | Pike et al. | 428/198 |
| 5,439,734 | 8/1995 | Everhart et al. | 428/224 |

FOREIGN PATENT DOCUMENTS

| | | |
|---|---|---|
| 78-042830 | 11/1978 | Japan. |
| 81-031380 | 7/1981 | Japan. |
| 60-045610 | 3/1985 | Japan. |
| 61-266616 | 11/1986 | Japan. |
| 62-041316 | 2/1987 | Japan. |
| 62-078213 | 4/1987 | Japan. |
| 62-170585 | 7/1987 | Japan. |
| 62-257459 | 11/1987 | Japan. |
| 63-006161 | 1/1988 | Japan. |
| 63-005495 | 2/1988 | Japan. |
| 63-105139 | 5/1988 | Japan. |
| 01-162813 | 6/1989 | Japan. |
| 01-162825 | 6/1989 | Japan. |
| 01-168919 | 7/1989 | Japan. |
| 89-054052 | 11/1989 | Japan. |
| 02-091210 | 3/1990 | Japan. |
| 02-091216 | 3/1990 | Japan. |
| 2084531 | 3/1990 | Japan. |
| 02-169722 | 6/1990 | Japan. |
| 02-182962 | 7/1990 | Japan. |
| 02-229270 | 9/1990 | Japan. |
| 02-251673 | 10/1990 | Japan. |
| 03-199425A | 8/1991 | Japan. |
| 03-220358 | 9/1991 | Japan. |
| 03-269153 | 11/1991 | Japan. |
| 03-294585 | 12/1991 | Japan. |
| 04-018124 | 1/1992 | Japan. |
| 04-126840 | 4/1992 | Japan. |
| 04-202895 | 7/1992 | Japan. |
| 04-263679 | 9/1992 | Japan. |
| 41-33849 | 11/1992 | Japan. |
| 04-361618 | 12/1992 | Japan. |
| 05-25762 | 2/1993 | Japan. |
| 50-25772 | 2/1993 | Japan. |
| 05-51818 | 3/1993 | Japan. |
| 05-106160 | 4/1993 | Japan. |
| 05-106161 | 4/1993 | Japan. |
| 05-106162 | 4/1993 | Japan. |
| 05-163664 | 6/1993 | Japan. |
| 05-186946 | 7/1993 | Japan. |
| 05-230777 | 9/1993 | Japan. |
| 05-239740 | 9/1993 | Japan. |
| 62-093117 | 10/1994 | Japan. |
| 1 513 043 | 10/1989 | U.S.S.R.. |
| 1 074 088 | 6/1967 | United Kingdom. |
| 1 217 892 | 12/1970 | United Kingdom. |
| 1 218 191 | 1/1971 | United Kingdom. |
| 1 260 836 | 1/1972 | United Kingdom. |
| 1 260 837 | 1/1972 | United Kingdom. |
| 1 364 430 | 8/1974 | United Kingdom. |
| 1 540 941 | 2/1979 | United Kingdom. |
| 2 065 732 | 7/1981 | United Kingdom. |
| 95/03172 | 2/1995 | WIPO. |

5,759,926

FINE DENIER FIBERS AND FABRICS MADE THEREFROM

CROSS REFERENCE TO RELATED APPLICATION

This application is a continuation-in-part of application Ser. No. 08/484,365, filed Jun. 7, 1995, now abandoned.

BACKGROUND OF THE INVENTION

The present invention is related to fine denier fibers. More specifically, the invention is related to fine denier fibers obtained from splitting conjugate fibers and to fabrics made from such fine fibers.

Melt extrusion processes for spinning continuous filament yarns and spunbond filaments are well known in the art. These filaments provide advantageous properties, e.g., strength, over microfibers such as meltblown fibers since the molecular chains of the polymers forming the yarn and spunbond filaments have a higher level of orientation than the meltblown microfibers. However, it is highly difficult to produce yarn filaments and spunbond filaments having a fine thickness or denier, i.e., a weight-per-unit-length of 2 denier or less. One approach in overcoming this production difficulty is fibrillating or splitting continuous filaments or staple fibers.

There are various methods known in the art for splitting filaments and fibers. For example, a known method for producing split fiber structures includes the steps of forming fibrillizable or splittable multicomponent conjugate fibers into a fibrous structure and then treating the fibrous structure with an aqueous emulsion of benzyl alcohol or phenyl ethyl alcohol to split the composite fibers. Another known method has the steps of forming splittable conjugate filaments into a fibrous structure and then splitting the conjugate fibers of the fibrous structure by flexing or mechanically working the fibers in the dry state or in the presence of a hot aqueous solution. Yet another method for producing split fibers is a needling process. In this process, conjugate fibers are hydraulically or mechanically needled to fracture and separate the cross-sections of conjugate fibers, forming fine denier split fibers.

Another method for producing fine fibers, although it is not a split fiber production process, utilizes conjugate fibers that contain a solvent soluble polymer component. For example, a fibrous structure is produced from sheath-core or island-in-sea conjugate fibers and then the fibrous structure is treated with water or other solvent to dissolve the sheath or sea component, producing a fibrous structure of fine denier fibers of the core or island component.

Although many different prior art processes, including the above described processes, for producing split or dissolved fine denier fibers are known, each of the prior art processes suffers from one or more drawbacks: for example, the use of chemicals, which may create disposal problems; a long fibrillation processing time; a cumbersome hydraulical or mechanical fiber splitting process; and/or incomplete and nonuniform split. Consequently, the prior art split fiber production processes are not highly suitable for continuous, commercial scale production. In addition, the prior art processes do not tend to produce uniformly split fibers and/or do not provide high levels of fiber splitting.

There remains a need for a production process that is simple and is not deleterious to the environment and that provides high levels of fiber splitting. Additionally, there remains a need for a fine fiber production process that is continuous and can be used in large commercial-scale productions.

SUMMARY OF THE INVENTION

The present invention provides a splittable conjugate fiber containing at least two incompatible polymer components that are arranged in distinct segments across the cross-section of the fiber along the length of the fiber: a first polymer component and a second polymer component. The first polymer component is incompatible with the second polymer component and one of the first and second polymer components is hydrophilic, wherein the first and, second polymer components form distinct unocclusive cross-sectional segments along the length of the fiber such that the segments are dissociable. Desirably, the segments dissociate in less than about 30 seconds when contacted with a hot aqueous split-inducing medium of the present invention. The conjugate fiber is highly suitable as a precursor for producing split fibers.

The invention also provides a blend of split fibers that contains fibers of a first polymer and fibers of a second polymer, wherein the first and second polymers are incompatible and at least one of the two polymer compositions is hydrophilic. The invention additionally provides a fabric containing the split fibers. The fabric can be a woven or a nonwoven fabric. The invention also provides a laminate of the split fiber fabric and a microfiber web, e.g., a meltblown web, or a film.

The invention also provides a process for producing split fine denier fibers. The process has the steps of providing conjugate fibers having at least two incompatible polymer compositions which form a multitude of distinct cross-sectional segments along substantially the entire length of the fibers, and contacting the conjugate fibers with hot aqueous split-inducing medium to split the conjugate fibers, wherein at least one of the polymer compositions is hydrophilic, and the segments form an unocclusive configuration such that they are dissociable.

The fine fiber fabric of the present invention exhibits the strength properties of a highly oriented fiber fabric and the desirable textural, visual and functional properties of microfiber fabric.

The term "steam" as used herein refers to both steam and a mixture of steam and air, unless otherwise indicated. The term "aqueous medium" as used herein indicates a liquid or gaseous medium that contains water or steam. The term "fibers" as used herein refers to both staple length fibers and continuous filaments, unless otherwise indicated. The term "spunbond fiber nonwoven fabric" refers to a nonwoven fiber fabric of small diameter filaments that are formed by extruding a molten thermoplastic polymer as filaments from a plurality of capillaries of a spinneret. The extruded filaments are cooled while being drawn by an eductive or other well-known drawing mechanism. The drawn filaments are deposited or laid onto a forming surface in a generally random, isotropic manner to form a loosely entangled fiber web, and then the laid fiber web is subjected to a bonding process to impart physical integrity and dimensional stability. The production of spunbond fabrics is disclosed, for example, in U.S. Pat. Nos. 4,340,563 to Appel et al., 3,802,817 to Matsuki et al. and 3,692,618 to Dorschner et al. Typically, spunbond fibers have a weight-per-unit-length in excess of 2 denier and up to about 6 denier or higher, although finer spunbond fibers can be produced. The term "staple fibers" refers to discontinuous fibers, which typically have an average diameter similar to or somewhat smaller than that of spunbond fibers. Staple fibers are produced with a conventional fiber spinning process and then cut to a staple length, from about 1 inch to about 8 inches. Such staple fibers are subsequently carded or air-laid and thermally or adhesively bonded to form a nonwoven fabric.

DETAILED DESCRIPTION OF THE INVENTION

Figure 1:
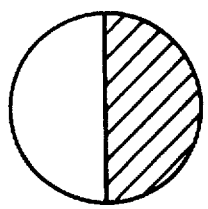
FIGS. 1–4 illustrate suitable conjugate fiber configurations for the present invention.

The present invention provides fine fibers produced from splitting multicomponent conjugate fibers and a method for producing the same. The invention additionally provides woven and nonwoven fabrics containing the split fine fibers. The present fine fibers are produced from spontaneously splittable conjugate fibers, and the splittable conjugate fibers can be characterized in that each splittable fiber contains at least two incompatible component polymers and at least one of the component polymers is hydrophilic. In accordance with the present invention, the hydrophilic component polymer is a naturally hydrophilic polymer or a hydrophilically modified polymer. The term "hydrophilic" as used herein indicates affinity for water. The hydrophilicity of the hydrophilic component polymer can be measured in accordance with the ASTM D724-89 contact angle testing procedure on a film produced by melt casting the polymer at the temperature of the spin pack that is used to produce the conjugate fibers. Desirably, the hydrophilic polymer component has an initial contact angle equal to or less than about 80°, more desirably equal to or less than about 75°, even more desirably equal to or less than about 60°, most desirably equal to or less than about 50°. The term "initial contact angle" as used herein indicates a contact angle measurement made within about 5 seconds of the application of water drops on a test film specimen.

The splittable conjugate fiber of the present invention spontaneously splits without extraneous mechanical agitation or fibrillation when the fiber is contacted with a hot aqueous split-inducing medium. Aqueous split-inducing media suitable for the invention include hot water, desirably hot water having a temperature of at least about 60° C., more desirably a temperature between about 65° C. and 100° C. Additionally suitable media are steam and mixture of steam and air that have a temperature higher than 60° C. but lower than the melting point of the lowest melting polymer of the conjugate fiber in order to prevent inadvertent melting of the polymer components during the fiber splitting process. When an air and steam mixture medium is utilized, the temperature of the air, which is mixed with steam, can be adjusted to change the temperature of the split-inducing medium. For example, the temperature of the air can be elevated to further increase the temperature of the steam-air mixture.

In accordance with the invention, the splittable conjugate fibers split in a time frame equal to or less than about 30 seconds; desirably equal to or less than about 10 seconds; more desirably equal to or less than 5 seconds; most desirably less than equal to or less than 1 seconds, e.g., nearly instantaneous, when contacted with the split-inducing medium. In addition, at least about 25%, desirably at least about 50%, more desirably at least about. 75%, most desirably at least about 95% and up to 100% of the conjugate fiber splits with the present fiber splitting process.

The present split fiber production process is highly advantageous over prior art split fiber production processes. Unlike prior art fiber splitting processes, the splitting process is spontaneous, i.e., requires a short treatment time; does not require the use of hazardous chemicals; and does not require extraneous mechanical means to cause the splitting of the fibers. In addition, the present splitting process does not produce significant amounts of byproducts that need to be disposed of or recovered since the present splittable fibers do not require environmentally harmful chemicals and do not require dissolving component polymers of the fibers to produce split fibers. Furthermore, the present process is highly adaptable for splitting continuous filaments as well as staple fibers, thereby making the present process highly suitable for continuous production processes as well as batch production processes.

The present conjugate fiber splitting process provides various ways to control the extent of fiber splitting. For example, the hydrophilicity of the component compositions for the conjugate fibers can be adjusted, the temperature of the aqueous split-inducing medium can be adjusted, or the duration of exposure to the split-inducing medium can be controlled to regulate the extent of fiber splitting. The hydrophilicity of the compositions can be simply adjusted by selecting polymers with varying levels of inherent hydrophilicity and by varying the level of addition and/or changing the type of the hydrophilic modifier when such a modifier is used.

As stated above, the fine fibers of the invention are produced from multicomponent conjugate fibers having at least two incompatible component polymers that are placed to occupy distinct segments across the cross-section along the entire or substantially entire length of the fibers. In accordance with the present invention, each segment of the conjugate fiber is occupied by a polymer that is incompatible with the polymer or polymers of the adjacent segment or segments. For example, two incompatible polymer compositions are alternatingly disposed to form a unitary conjugate fiber or a number of mutually incompatible polymers are formed into a conjugate fiber.

The splittable conjugate fiber should have a cross-sectional configuration that is amenable to partial or complete dissociation. Accordingly, at least one dissociable segment of the cross-section of the conjugate fiber, which is occupied by one of the component polymers of the fiber, forms a portion of the peripheral surface of the fiber and has a configuration that is not occluded by the adjacent segments such that the dissociable segment is not physically impeded from being separated.

Figure 2:
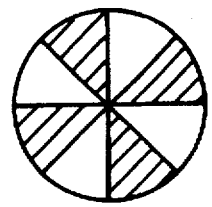
Figure 3:
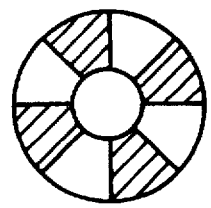
Figure 4:
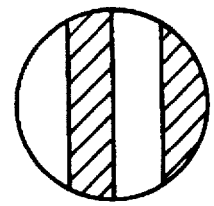
Figure 5:
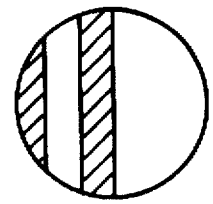
FIG. 5–6 illustrate asymmetrical conjugate fiber configurations that are suitable for producing crimped conjugate fibers.
Figure 6:
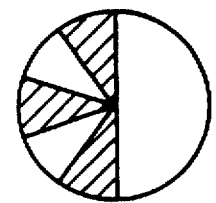

Suitable configurations for the conjugate fibers include side-by-side configurations (FIG. 1), wedge configurations (FIG. 2), hollow wedge configurations (FIG. 3) and sectional configurations (FIG. 4). Of the various configurations, most desirable are sectional configurations. It is to be noted that a suitable configuration does not need to have a symmetrical geometry provided that it is not occlusive or interlocking. Correspondingly, suitable configurations also include asymmetrical configurations, for example, shown in FIGS. 5–6. FIG. 5 illustrates a conjugate fiber of a sectional configuration that has an unevenly large end segment: of a component polymer; and FIG. 6 illustrates a conjugate fiber of a wedge configuration that has one unevenly large segment of a component polymer. These asymmetrical configurations are suitable for imparting crimps in the conjugate fibers and, thus, for increasing the loft of the fabric produced therefrom, as further discussed below. In addition, the different component polymers of the conjugate fiber need not be present in equal amounts. For example, a component polymer of the conjugate fiber may form a thin film-like section that merely acts as a divider between two adjacent polymer components, thus, providing a fabric that contains fine denier fibers of mainly one polymer component. Additionally, a component polymer can be asymmetrically placed within the cross-section of the conjugate fiber such that the split fibers produced therefrom have various cross-sectional shapes.

Figure 7:
FIG. 7 illustrates a particularly suitable conjugate fiber configuration for the invention.

The splittable conjugate fibers need not be conventional round fibers. Other useful fiber shapes include rectangular, oval and multilobal shapes and the like. Particularly suitable fiber shapes for the present invention are rectangular or oval shapes. FIG. 7 illustrates the cross-section of an exemplary rectangular conjugate fiber that is particularly suitable for the present invention. The thin rectangular or ribbon shape of the conjugate fiber provides a higher surface area that can be exposed to the split-inducing medium, better facilitating spontaneous splitting of the conjugate fiber. Consequently, compared to conventional round conjugate fibers, the rectangular conjugate fiber splits more easily when subjected to the split-inducing medium.

The splittable conjugate fibers may be crimped or uncrimped. Crimped splittable conjugate fibers of the present invention are highly useful for producing lofty woven and nonwoven fabrics since the fine fibers split from the conjugate fibers largely retain the crimps of the conjugate fibers and the crimps increase the bulk or loft of the fabric. Such lofty fine fiber fabric of the present invention exhibits cloth-like textural properties, e.g., softness, drapability and hand, as well as desirable strength properties of a fabric containing highly oriented fibers. As for uncrimped split fiber fabrics, such fabrics provide improved uniform fiber coverage and strength properties as well as improved hand and texture.

In accordance with the invention, split fibers having various thicknesses can be conveniently produced by adjusting the thickness of the conjugate fibers and/or adjusting the number of segments or zones within the cross-section of the conjugate fibers. In general, a conjugate fiber having a finer thickness and/or a higher number of cross-sectional segments results in finer split fibers. Correspondingly, the thickness of the split fibers can be controlled to have a wide variety of thicknesses. Of the suitable thickness controlling methods, the method of adjusting the number of cross-sectional segments is particularly desirable for the present invention.

As discussed above, hydrophilic polymers suitable for the present conjugate fiber include both hydrophilic and hydrophilically modified polymers. When hydrophobic or insufficiently hydrophilic polymers are utilized, the polymers need to be hydrophilically modified, as further discussed below. A suitable hydrophilic polymer for the present invention desirably has an initial contact angle equal to or less than about 80°.

Inherently hydrophilic polymers suitable for the present invention include thermoplastic polymers having the above-specified hydrophilicity. Such polymers include copolymers of caprolactam and alkylene oxide diamine, e.g., Hydrofil®, which are commercially available from AlliedSignal Inc.; copolymers of poly(oxyethkylene) and polyurethane, polyamide, polyester or polyurea, e.g., absorbent thermoplastic polymers disclosed in U.S. Pat. No. 4,767,825 to Pazos et al.; ethylene vinyl alcohol copolymers; and the like. U.S. Pat. No. 4,767,825 in its entirety is herein incorporated by reference.

Hydrophilically modifiable polymers suitable for the present invention include polyolefins, polyesters, polyamides, polycarbonates and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polybutylene terephthalate, polytetramethylene terephthalate, polycyclohexylene-1,4-dimethylene terephthalate, and isophthalate copolymers thereof, as well as blends thereof.

In accordance with the present invention, when a hydrophobic or insufficiently hydrophilic polymer is used as the hydrophilic component of the splittable conjugate fiber, the polymer must be hydrophilically or wettably modified. One useful means for modifying the polymer is adding a hydrophilic modifying agent or hydrophilic modifier that renders the polymer hydrophilic. Suitable hydrophilic modifiers include various surfactants. Depending on the final use of the split fiber material, the surfactants can be fugitive or nonfugitive. Fugitive surfactants, i.e., surfactants that wash off from the fiber surface, are suitable if the split fibers are used in single exposure applications or applications in which nonwettable or hydrophobic properties are desired, and nonfugitive surfactants, i.e., surfactants that permanently or semipermanently adhere to the fiber surface, are suitable if the split fibers are used in applications in which more durably wettable or hydrophilic properties are desired. In addition, particularly suitable internally added surfactants are selected to have a low compatibility with the polymer of the hydrophilic component of the fiber since such surfactants readily migrate to the surface of the fiber during the fiber spinning process. When a surfactant having a slow migration characteristic is utilized, the fibers may need to be heat treated or annealed to facilitate the migration of the surfactant to the surface. Such heat treatment is known in the art as a "blooming" process. Illustrative examples of suitable surfactants include silicon based surfactants, e.g., polyalkylene-oxide modified polydimethyl siloxane; fluoroaliphatic surfactants, e.g., perfluoroalkyl polyalkylene oxides; and other surfactants, e.g., actylphenoxypolyethyoxy ethanol nonionic surfactants, alkylaryl polyether alcohols, and polyethylene oxides. Commercially available surfactants suitable for the present invention include various poly(ethylene oxide) based surfactants available under the tradename Triton, e.g., grade X-102, from Rohm and Haas Crop; various polyethylene glycol based surfactants available under the tradename Emerest, e.g., grades 2620 and 2650, from Emery Industries; various polyalkylene oxide modified polydimethylsiloxane based surfactants available under the tradename Masil, e.g., SF-19, which is available from Mazer; polyalkylene oxide fatty acid derivatives available under the tradename PEG, e.g. PEG 400, which is available from ICI; sorbitan monooleate, e.g., Span 80, which is available from ICI; ethoxylated hydroxylated castor oil, e.g., G1292, which is available from ICI; a mixture of sorbitan monooleate and ethoxylated hydroxylated castor oil, e.g., Ahcovel Base N62, which is available from ICI; polyoxyalkylene modified fluoroaliphatic surfactants which are available, e.g., from Minnesota Mining and Manufacturing Co.; and mixtures thereof.

The amount of surfactants required and the hydrophilicity of modified fibers for each application will vary depending on the type of surfactant and the type of polymer used. In general, fibers containing more hydrophilic or hydrophilically modified polymer components result in more spontaneous splitting. Consequently, a high level of a surfactant can be added to the polymer composition of the conjugate fibers provided that the surfactant level is not too high as to adversely affect the processibility of the polymer composition. Typically, the amount of the surfactant suitable for the present fiber composition is in the range of from about 0.1% to about 5%, desirably from about 0.3% to about 4%, by weight based on the weight of the polymer composition. The surfactant is thoroughly blended with the polymer composition before the composition is processed into fibers. For example, when a melt-extrusion process for producing fibers is utilized, the surfactant is blended and melt-extruded with the polymer compositions in extruders and then spun into fibers.

In accordance with the present invention, additional component polymers for the conjugate fibers are selected from hydrophilic and hydrophobic thermoplastic polymers that are incompatible with the hydrophilic component polymer of the conjugate fibers. Suitable polymers include the above illustrated hydrophilic polymers and hydrophobic polymers that are suitable for the hydrophilic component, provided that they are incompatible with the hydrophilic component polymer.

The term "incompatible polymers" as used herein indicates polymers that do not form a miscible blend, i.e., immiscible, when melt blended. As a desirable embodiment of the present invention, differences in the polymer solubility parameter (δ) are used to select suitably incompatible polymers. The polymer solubility parameters (δ) of different polymers are well known in the art. A discussion of the solubility parameter is, for example, disclosed in *Polymer: Chemistry and Physics of Modern Materials*, pages 142–145, by JMG Cowie, International Textbook Co., Ltd., 1973. Desirably, the adjacently disposed polymer components of the present conjugate fiber have a difference in the solubility parameter of at least about 0.5 $(cal/cm^3)^{1/2}$, more desirably at least about 1 $(cal/cm^3)^{1/2}$, most desirably at least about 2 $(cal/cm^3)^{1/2}$. The upper limit of the solubility parameter difference is not critical for the present invention since the higher the difference, the more spontaneous the splitting of the fiber becomes.

Illustrative examples of particularly desirable pairs of incompatible polymers useful for the present invention include polyolefin-polyamide, e.g., polyethylene-nylon 6, polyethylene-nylon 6/6, polypropylene-nylon 6, polypropylene-nylon 6/6, polyethylene-a copolymer of caprolactam and alkylene oxide diamine, and polypropylene a copolymer of caprolactam and alkylene oxide diamine; polyolefin-polyester, e.g., polyethylene-polyethylene terephthalate, polypropylene-polyethylene terephthalate, polyethylene-polybutylene terephthalate and polypropylene-polybutylene terephthalate; and polyamidepolyester, e.g., nylon 6-polyethylene terephthalate, nylon 6/6-polyethylene terephthalate, nylon 6-polybutylene terephthalate, nylon 6/6-polybutylene terephthalate, polyethylene terephthalate-a copolymer of caprolactam and alkylene oxide diamine, and polybutylene terephthalate-a copolymer of caprolactam and alkylene oxide diamine and polypropylene.

Processes suitable for producing the conjugate fibers of the present invention include conventional textile filament production processes, staple fiber production processes and spunbond fiber production processes. These conjugate fiber production processes are known in the art. For example, U.S. Pat. No. 5,382,400 to Pike et al. discloses a suitable process for producing the conjugate fibers and webs thereof, which patent is herein incorporated in its entirety by reference.

The conjugate fibers and filaments of the invention can be formed into a nonwoven fabric or processed into a woven fabric. For example, spunbond filaments can be directly deposited onto a forming surface to form a nonwoven fabric; staple fibers can be carded or wet or air laid to form a nonwoven fabric; and spun yarn of the staple fibers or continuous filaments can be processed into a woven fabric by a conventional textile weaving process. For nonwoven fabrics, the conjugate fibers can be deposited into a nonwoven web and then split before or after the nonwoven web is bonded to form a structurally stable nonwoven fabric, and for woven fabrics, the conjugate fibers can be split before or after the fibers are woven into a fabric.

The present conjugate fibers and fabrics produced from the conjugate fibers can be characterized in that the fibers can be split or fibrillated by contacting the fibers and fabrics with a hot aqueous medium such as hot water or steam without the need for an extraneous mechanical fibrillation step. Surprisingly, it has been found that the present conjugate fibers spontaneously split when they are contacted with a hot aqueous split-inducing medium. For the present invention, any process that is capable of thoroughly contacting the fibers and fabrics with a hot aqueous split-inducing medium can be employed. For example, the fibers and webs can be passed through a hot water bath. Alternatively, hot water or steam can be sprayed on the conjugate fibers or fabrics produced therefrom.

Figure 8:
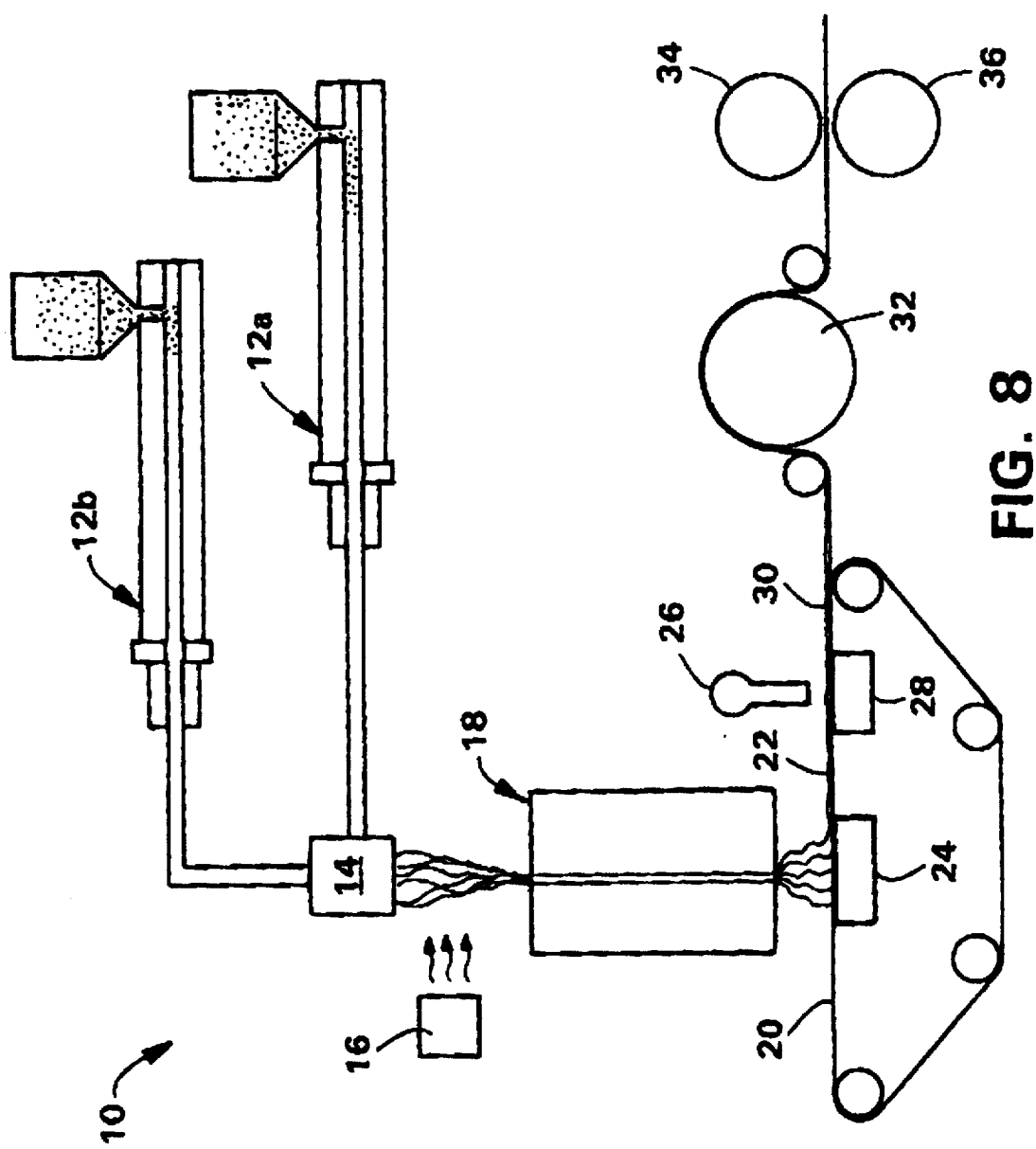
FIG. 8 illustrates an exemplary process for producing the splittable conjugate fibers and the split fiber fabric produced from the conjugate fibers.

FIG. 8 illustrates an exemplary process for producing a split fine fiber web of the present invention. A process line 10 is arranged to produce a spunbond nonwoven web of split fibers containing two polymer components (bicomponent). The process line 10 includes a pair of extruders 12a and 12b for separately melt-processing two incompatible component polymers. One or both of the component polymers are hydrophilic polymers or hydrophobic polymers blended with effective amounts of a hydrophilic modifier in accordance with the present invention, and they are fed into respective extruders. Alternatively, the hydrophilic modifier can be injected into the respective extruders. The polymers are melt-processed in the extruders and then fed to a spinneret 14 of, for example, a sectional conjugate fiber spinneret. Generally described, the spinneret 14 includes a housing containing a spin pack which includes a plurality of plates stacked one on top of the other with a pattern of openings arranged to create flow paths for directing polymer extrudates through the spinneret into spinning holes. Each of the spinning holes receives predetermined amounts of the two extrudates in a predetermined sectional configuration.

forming a downwardly extending strand of the conjugate filament. The spinneret produces a curtain of the conjugate filaments. A quench air blower 16 is located adjacent the curtain of filaments extending from the spinneret 14 to quench the polymer compositions of the filaments.

The filaments are then fed through a pneumatic fiber draw unit 18 to draw the filaments to impart molecular orientation therein and, thus, to increase the strength properties of the filaments. Pneumatic fiber draw units are known in the art, and an exemplary fiber draw unit suitable for the spunbond process is described in U.S. Pat. No. 3,802,817 to Matsuki et al., which patent is herein incorporated by reference. Generally described, the fiber draw unit 18 includes an elongated vertical passage through which the filaments are drawn by drawing air entering from the sides of and flowing downwardly through the passage. During the fiber drawing process, the fibers can be simultaneously crimped and drawn. When the polymer compositions for the fibers have different shrinkage properties and are disposed in an asymmetrical or a side-by-side configuration, the temperature of the aspirating air can be elevated to impart crimps in the filaments while drawing the filaments. In general, a higher air temperature results in more highly crimped filaments. This simultaneous drawing and crimping process is more fully disclosed in above-mentioned U.S. Pat. No. 5,382,400.

The drawn filaments exiting the fiber drawing unit 18 can be collected for further processing into splittable fibers or yarns, or deposited onto a foraminous forming surface 20 to form a nonwoven web 22. A vacuum apparatus 24 is positioned below the forming surface 20 to facilitate the proper placement of the filaments. The formed web 22 is then carried on the foraminous surface 20 to a sprayer 26 that applies a split-inducing medium onto the web 22. Again, a vacuum apparatus 24 is positioned below the forming surface 20 directly underneath the sprayer 26 such that the split-inducing medium is rapidly and thoroughly applied on the web and the used medium is removed from the web. When the fibers of the web contact the split-inducing medium, the segments of the fibers split into fine fibers. Alternatively, the formed web can be transported through a hot water bath to split the fibers. The split fiber web 30 is dried, for example, on a drum drier 32. The dried fine fiber web is then bonded. Any nonwoven fabric bonding process can be used to bond the fine fiber web, including calender bonding, pattern bonding, ultrasonic bonding, through-air bonding, adhesive bonding and hydroentangling processes. FIG. 8 illustrates an exemplary bonding process—a pattern bonding process. The pattern bonding process employs pattern bonding roll pairs 34 and 36 for effecting bond points at limited areas of the web by passing the web through the nip formed by the bonding rolls 34 and 36. One or both of the roll pair have a pattern of land areas and depressions on the surface, which effects the bond points, and are heated to an appropriate temperature. The temperature of the bonding rolls and the nip pressure are selected so as to effect bonded regions without: having undesirable accompanying side effects such as excessive shrinkage and web degradation. Although appropriate roll temperatures and nip pressures are generally influenced by parameters such as web speed, web basis weight, fiber characteristics, component polymers and the like, the roll temperature desirably is in the range between the softening point and the crystalline melting point of the lowest melting component polymer. For example, desirable settings for bonding a fine fiber web that contains split polypropylene fibers, e.g., a web of polypropylene and polyamide split fibers, are a roll temperature in the range of about 125° C. and about 160° C. and a pin pressure on the fabric in the range of about 350 kg/cm$^2$ and about 3,500 kg/cm$^2$. Other exemplary bonding processes suitable for the present fine fiber fabric include through-air bonding processes. A typical through-air bonding process applies a flow of heated air onto the fine fiber web to effect interfiber bonds, and the bonding process is particularly useful for nonwoven webs containing high melting fibers and low melting fibers such that the low melting fibers can be heat activated to form interfiber bonds while the high melting fibers retain the physical integrity of the webs. The heated air is applied to heat the web to a temperature above the melting point of the lowest melting polymer of the web but below the melting point of the highest melting polymer of the web. A through-air bonding process does not require any significant compacting pressure and, thus, is highly suitable for producing a lofty bonded fabric.

The split fiber fabric of the present invention provides a combination of desirable properties of conventional microfiber fabrics and highly oriented fiber fabrics. The split fiber fabric exhibits desirable properties, such as uniformity of the fabric, uniform fiber coverage, barrier properties and high fiber surface area, that are akin to microfiber fabrics. In addition, unlike microfiber fabrics such as meltblown webs, the split fiber fabric also exhibits highly desirable strength properties, desirable hand and softness and can be produced to have different levels of loft. The desirable strength properties are attributable to the high level of molecular orientation of the precursor conjugate fibers, unlike meltblown microfibers, and the desirable textural properties are attributable to the fineness of the split fibers, unlike oriented conventional unsplit fibers.

Furthermore, the present split fiber production process is highly advantageous over prior art split fiber production processes. The present process is a flexible, noncompacting process that can be used to produce split fiber fabrics having a wide variety of loft and density. Unlike prior art needling processes for splitting fibers that inherently compact the precursor web, the present process does not apply compacting forces to split conjugate fibers. Accordingly, the present process does not alter the loft of the precursor fiber web or fabric during the fiber splitting process. In addition, the present process does not sacrifice the strength properties of the precursor fiber web or filaments. Unlike prior art solvent dissolving processes for producing fine fibers, the present process retains all of polymeric components of the conjugate fibers during the fiber splitting process. Consequently, the present process at least retains or even improves strength properties of the precursor web or filaments. This is because the present process retains the polymeric components of the precursor web or filaments while increasing the number of fiber strands, and because a web or filament bundle having a higher number of fiber strands is stronger than a coarse fiber web or filament bundle of the same polymer, the same basis weight and a similar level of molecular orientation.

Fabrics containing the split fine fibers that exhibit the above-illustrated desirable properties are highly suitable for various uses. For example, nonwoven fabrics containing the split fine fibers are highly suitable for various uses including disposable articles, e.g., protective garments, sterilization wraps, wiper cloth and covers for absorbent articles; and woven fabrics containing the split fine fibers that exhibit highly improved softness and uniformity are highly useful for soft apparel, dusting and wiper cloth and the like.

As another embodiment of the present invention, the soft, strong fine fiber fabric may be used as a laminate that contains at least one layer of the fine fiber fabric and at least one additional layer of another woven or nonwoven fabric or a film. The additional layer for the laminate is selected to impart additional and/or complementary properties, such as liquid and/or microbe barrier properties. The layers of the laminate can be bonded to form a unitary structure by a bonding process known in the art to be suitable for laminate structures, such as a thermal, ultrasonic or adhesive process.

A laminate structure highly suitable for the present invention is disclosed in U.S. Pat. No. 4,041,203 to Brock et al., which is herein incorporated in its entirety by reference. In adapting the disclosure of U.S. Pat. No. 4,041,203, a pattern bonded laminate of at least one split continuous filament nonwoven web, e.g., split spunbond conjugate fiber web, and at least one microfiber nonwoven web, e.g., meltblown web, can be produced; and such laminate combines the strength and softness of the split fiber fabric and the breathable barrier properties of the microfiber web. Alternatively, a breathable film can be laminated to the fine fiber web to provide a breathable barrier laminate that exhibits a desirable combination of useful properties, such as soft texture, strength and barrier properties. As yet another embodiment of the present invention, the fine fiber fabric can be laminated to a non-breathable film to provide a strong, high barrier laminate having a cloth-like texture. These laminate structures provide desirable cloth-like textural properties, improved strength properties and high barrier properties. The laminate structures, consequently, are highly suitable for various uses including various skin-contacting applications, such as protective garments, covers for diapers, adult care products, training pants and sanitary napkins, various drapes, and the like.

The following examples are provided for illustration purposes and the invention is not limited thereto.

EXAMPLES:

Hydrophilic modifying agent used:
Span 80 sorbitan
monooleate, which is available from ICI.
Span 80 exhibited a contact angle of about 20°.
G1292
ethoxylated hydroxylated castor oil, which is available from ICI. G1292 exhibited a contact angle of about 12°.
Ahcovel Base N-62 (Ahcovel)
a mixture of 45% sorbitan monooleate and 55% of ethoxylated hydroxylated castor oil, which is available from ICI. Ahcovel exhibited a contact angle of about 10°.
SF-19
ethoxylated polysiloxane, which is available from Mazer. SF-19 exhibited a contact angle of about 0°.

Testing Procedures used:
Contact Angle of Component Polymers: The contact angle is an initial contact angle, i.e., measured within 5 seconds, that was measured on a 13 cm×13 cm cast film, which had a 3 mm thickness, with deionized water in accordance with ASTM D724-89.

Contact Angle of Surfactants: The contact angle was measured in accordance with ASTM D724-89 using a 0.05 mm cast film produced from Exxon's 3445 polypropylene. A piece of the film was dipped in each surfactant and drip dried, and then the coated film was tested for the contact angle.

Examples 1–8 (Ex1–Ex8)

Two denier crimped conjugate spunbond filaments having 50 wt % linear low density polyethylene/50 wt % nylon 6 and having a side-by-side configuration were produced. The linear low density polyethylene (LLDPE) was Dow Chemical's LLDPE 6811A, and the nylon 6 used was custom polymerized polycaprolactam, which was produced by Nyltech, Manchester, N.H., and had a formic acid relative viscosity of 1.85. LLDPE was blended with 2 wt % of a $TiO_2$ concentrate containing 50 wt % of $TiO_2$ and 50 wt % of polypropylene, and the mixture was fed into a first single screw extruder. Nylon 6 was fed into a second single screw extruder. In addition, 2 wt % of one of the above surfactants, as indicated in Table 1, was blended with the LLDPE or nylon 6 composition before the composition was fed into the extruders. The compositions for Examples 1–8 are shown in Table 1. The melt temperature of the LLDPE extrudate was about 232° C., and the melt temperature of the nylon 6 extrudate was about 232° C.

The extruded polymers were fed to a bicomponent spinning die and spun into round bicomponent fibers in accordance with the bicomponent spunbond fiber production process disclosed in afore-mentioned U.S. Pat. No. 5,382,400. The bicomponent spinning die had a 0.6 mm spinhole diameter and a 4:1 L/D ratio. The spinhole throughput rate was 0.5 gram/hole/minute. The spinning die was maintained at 232° C. The bicomponent filaments exiting the spinning die were quenched by a flow of air having a flow rate of 0.5 $m^3$/min/cm spinneret width and a temperature of 18° C. The quenching air was applied about 5 inches below the spinneret, and the quenched fibers were drawn in a fiber draw unit of the type which is described in U.S. Pat. No. 3,802,817 to Matsuki et al. The quenched filaments were drawn with the flow of air, which was heated to about 93° C., in the fiber draw unit to attain crimped filaments of 2 denier. The drawn filaments were deposited onto a foraminous forming surface, forming a lofty web of filaments.

The filaments were collected and then submerged in boiling water for about 5 seconds to induce splitting, the split filaments were removed and dried with a paper towel. The split filaments largely retained the crimped configuration of the conjugate filaments. The degree of splitting was visually determined under a microscope. The results are shown in Table 1.

Comparative Examples 1–2 (C1–C2)

For Comparative Examples 1 and 2, the procedures outlined for Examples 2 and 7, respectively, were repeated except an unmodified polysiloxane, Dow 200, was used in place of the hydrophilic modifiers. Dow 200 is a hydrophobic processing aid which is available from Dow Chemical. The results are shown in Table 1.

Comparative Example 3 (C3)

Example 1 was repeated except no modifier was added to the polymer compositions. The results are shown in Table 1.

TABLE 1

| | Modifier | | | Hydrophilicity of Modified Polymer Components | | |
|---|---|---|---|---|---|---|
| | Surfactant | | | | | |
| Example | Name | Contact Angle | % in LLDPE | % in Nylon 6 | (Contact Angle) LLDPE | Nylon 6 | % Split* |

| Example | Name | Contact Angle | % in LLDPE | % in Nylon 6 | LLDPE | Nylon 6 | % Split* |
|---|---|---|---|---|---|---|---|
| EX1 | Span 80 | 20° | 4 | 0 | 25° | 90° | 79% |
| Ex2 | Span 80 | 20° | 2 | 0 | 33° | 90° | 70% |
| Ex3 | Span 80 | 20° | 1 | 0 | 62° | 90° | 67% |
| Ex4 | G1292 | 12° | 2 | 0 | — | 90° | 90% |
| Ex5 | SF-19 | 0° | 2 | 0 | 43° | 90° | 86% |
| Ex6 | SF-19 | 0° | 0.5 | 0 | 40° | 90° | 47% |
| C1 | Dow 200 | 97° | 2 | 0 | — | 90° | 0% |
| Ex7 | Span 80 | 20° | 0 | 2 | 90° | — | 40% |
| Ex8 | SF-19 | 0° | 0 | 2 | 90° | 40° | 95% |
| C2 | Dow 200 | 97° | 0 | 2 | 90° | — | 0% |
| C3 | — | — | 0 | 0 | 90° | 90° | 0% |

*This is a visually estimated ratio of the number of split conjugate fibers over the number of total conjugate fibers.

Examples 1–8 clearly demonstrate that the hydrophilically modified conjugate fibers split readily when treated with a hot aqueous fibrillation-inducing medium. In contrast, Comparative Examples 1–3 show that conjugate fibers that contain a nonhydrophilic processing modifier or that do not contain any processing modifier do not split. In addition, the results of Examples 1–8 show that the higher the hydrophilicity of the modifying agent, the more splittable the conjugate fiber becomes. Alternatively stated, a more hydrophilically modified conjugate fiber is more readily splittable. In addition, as can be seen from Examples 2–3 and 7–8, the present process is a highly flexible process, for example, that can utilize hydrophilic modifiers of different hydrophilicity to control the extent of fiber splitting.

Example 9

Side-by-side spunbond conjugate fibers of LLDPE and nylon 6 were produced in accordance with Example 1 with the continuous process setting that is illustrated in FIG. 8. For this example, the weight ratio between LLDPE and Nylon 6 was 67:33 and the nylon used was AlliedSignal's Capron® 1767. Masil SF-19 was used as the modifying agent and 1.5 wt % of SF-19 was added to the LLDPE composition. The spun and drawn conjugate fibers were directly deposited onto a forming surface to form a fiber web having a basis weight of about 102 g/m². Then the web was passed under a slit nozzle sprayer, which was placed about 6.4 cm above the forming surface. The nozzle sprayer had a 0.3 cm slot and covered the whole width of the web. About 4.5 m³/min of steam was supplied at 104° C., and the duration of the steam treatment on the web was about 0.5 seconds. The used steam was pulled away from the web by a vacuum box which was placed directly underneath the forming surface. The treated web was collected immediately after the steam treating section, and it was noticed that the web did not contain much moisture. The collected web was further dried with a paper towel, and the web was studied under a microscope. In addition, the nonwoven web was point bonded by feeding the web into the nip of a steel calender roll and a steel anvil roll. The calender roll had about 48 points/cm² of raised bond points, and the total bond area covered by the bond points was about 15% of the total surface area. The bonding rolls were heated to about 124° C. and applied a nip pressure of about 15.5 kg/lineal cm.

Nearly 100% of the conjugate fibers of the treated web were split, and the bonded web was soft, drapable and strong.

Example 10

Example 9 was repeated except polyethylene terephthalate was used in place of nylon 6. Polyethylene terephthalate used was EKX 101 from Hoechst Celanese Corp. Again, nearly 100% of the conjugate fibers were split.

Example 11

Example 10 was repeated, except polypropylene was used in place of LLDPE and 3 wt % of SF-19 was added to the polypropylene composition. Polypropylene used was Exxon's 3445 polypropylene. The resulting conjugate fibers were split nearly 100%.

Example 9–11 demonstrate that the conjugate fibers of the present invention need not be submerged in hot water to split the fibers and that the fibers split spontaneously when exposed to steam. In addition, as discussed above, the treated webs in accordance with this continuous process do not retain much moisture as the webs exit the steam treating section of the process. The combination of the spontaneous, high level fiber split and the low moisture content of this treating process makes this continuous process highly adaptable and suitable for large scale commercial production processes.

Comparative Example 4

Example 2 was repeated, except Exxon's 3445 polypropylene was used in place of nylon 6. The polypropylene composition also contained about 3 wt % of SF-19.

The resulting LLDPE/polypropylene conjugate fibers did not split when submerged in boiling water. It is to be noted that the solubility parameters for LLDPE and polypropylene are about the same at $8(cal/cm^3)^{1/2}$. This example demonstrates that the component polymers for the present conjugate fibers need to be incompatible.

Comparative Example 5

Conjugate fiber strands were prepared in accordance with Example 1, except the surfactant used was SF-19. Strands of the conjugate fiber were heat annealed at about 100° C. for 5 minutes in an oven in order to observe the effect of heat without the presence of moisture. The annealing process did not visually change the conjugate fibers. Consequently, applying heat alone does not cause the fibers to split.

Example 12

An inherently hydrophilic polymer was used to produce side-by-side bicomponent spunbond filaments by generally following the production procedure outlined in Example 1. For this example, no hydrophilic modifier was used, and the hydrophilic polymer used was a copolymer of caprolactam and alkylene oxide diamine, Hydrofil® LCFX, which was purchased from AlliedSignal Inc. The hydrophilicity of Hydrophil® LCFX as measured in contact angle was about 54°. The other component polymer was LLDPE, DOW 6811A.

The copolymer was melt-processed at about 260° C., and LLDPE was processed at about 229° C. The spinning die was maintained at 265° C. The bicomponent filaments exiting the fiber draw unit were collected. A bundle of the filaments was submerged in boiling water for 2 seconds., and then dried with a paper towel. The visual inspection under a microscope indicated that most of the filaments split into split LLDPE and copolymer filaments.

The result of Example 12, compared to Comparative Example 3, clearly demonstrate that the hydrophilic nature of the copolymer causes spontaneous split of the conjugate filaments.

Example 13

A number of beakers containing water of different temperatures that ranged from room temperature to 100° C. in about 5° C. intervals were prepared. The conjugate fiber strands prepared for Comparative Example 5 were submerged into the beakers for about 5 seconds and then removed. The fibers did not split until the fibers were submerged in 60° C. water.

This example demonstrates that the combination of heat and moisture is necessary for the present conjugate fiber splitting process.

As can be seen from the above examples, the present fiber splitting process is a spontaneous process that produces completely or substantially completely split fine fibers. In addition, the process is a flexible process that easily controls the extent of fiber splitting. Moreover, the split fiber fabric produced from the process provides a highly desirable combination of textural and strength properties.

What is claimed is:

1. A laminate comprising a fabric, which fabric comprises a first group and a second group of split fibers, said first group of fibers comprising a first thermoplastic polymer component, said second group of fibers comprising a second thermoplastic polymer component, wherein said first polymer component is incompatible with said second polymer component, said polymers having a solubility parameter difference of at least about 0.5 (cal/cm$^3$)$^{1/2}$ and at least one of said first and second polymer components is naturally hydrophilic or hydrophilically modified.

2. The laminate of claim 1 wherein said laminate comprises the split fiber fabric and a microfiber web.

3. The laminate of claim 1 wherein said laminate comprises the split fiber fabric and a film.

4. The laminate of claim 1 wherein the first and second polymer components are selected from polyolefin-polyamide, polyolefin-polyester and polyamide-polyester pairs.

5. The laminate of claim 4 wherein the hydrophilic polymer component has a contact angle equal to or less than about 80°.

6. A fabric comprising a blend of split fibers, said blend comprising a first group of split fibers and a second group of split fibers, said first group of fibers comprising a first thermoplastic polymer component, said second group of fibers comprising a second thermoplastic polymer component, wherein said first polymer component is incompatible with said second polymer component, said polymers having a solubility parameter difference of at least about 0.5 (cal/cm$^3$)$^{1/2}$ and at least one of said first and second polymer components is naturally hydrophilic or hydrophilically modified.

7. The split fiber fabric of claim 6 wherein the first and second polymers are selected from polyolefin-polyamide, polyolefin-polyester and polyamide-polyester pairs.

8. The split fiber fabric of claim 7 wherein the hydrophilic polymer component has a contact angle equal to or less than about 80°.

9. The split fiber fabric of claim 8 wherein said hydrophilic component contains a hydrophilic modifier.

10. The split fiber fabric of claim 8 wherein said split fibers have a weight-per-unit length between about 0.025 denier and about 2 denier.

11. The split fiber fabric of claim 8 wherein said fabric is a nonwoven fabric.

12. A blend of split fibers comprising:

fibers of a first polymer component, which comprises a first thermoplastic polymer; and fibers of a second polymer component, which comprises a second thermoplastic polymer, wherein said first polymer is incompatible with said second polymer, said first and second polymers have a solubility parameter difference of at least about 0.5 (cal/cm$^3$)$^{1/2}$ and at least one of said first and second polymer components is naturally hydrophilic or hydrophilically modified.

13. The split fiber blend of claim 12 wherein said first and second polymers are immiscible.

14. The split fiber blend of claim 13 wherein the first and second polymer pairs are selected from polyolefin-polyamide, polyolefin-polyester and polyamide-polyester pairs.

15. The split fiber blend of claim 14 wherein at least one of the first and second polymer components is hydrophilically modified with a surfactant.

16. The split fiber blend of claim 15 wherein said hydrophilically modified component has a contact angle equal to or less than about 80° as measured in accordance with ASTM D724-89.

17. The split fiber blend of claim 16 wherein said surfactant is fugitive.

18. A splittable conjugate fiber comprising:

a first polymer component, which comprises a first thermoplastic polymer; and a second polymer component, which comprises a second thermoplastic polymer, wherein said first polymer is incompatible with said second polymer and said first and second polymers have a solubility parameter difference of at least about 0.5 (cal/cm$^3$)$^{1/2}$, one of said first and second polymer components is naturally hydrophilic or hydrophilically modified and said polymer components form at least two distinct unocclusive cross-sectional segments along the length of said fibers such that said segments are dissociable.

19. The splittable conjugate fiber of claim 18 wherein said hydrophilic component has a contact angle equal to or less than about 80°.

20. The splittable conjugate fiber of claim 18 wherein said first and second polymers are immiscible.

21. The splittable conjugate fiber of claim 20 wherein the first and second polymer pair is selected from polyolefin-polyamide, polyolefin-polyester and polyamidepolyester pairs.

22. The splittable conjugate fiber of claim 22 wherein said hydrophilic polymer is hydrophilically modified and said hydrophilic modifier is a surfactant.

23. The splittable conjugate fiber of claim 19 wherein said conjugate fiber is spontaneously splittable when contacted with a hot aqueous split-inducing medium.

24. A splittable conjugate fiber comprising at least two incompatible thermoplastic polymers having a solubility parameter difference of at least about 0.5 $(cal/cm^3)^{1/2}$, at least one of said polymers being naturally hydrophilic or hydrophilically modified, said polymers being arranged in distinct segments which are continuous along the length of said fiber, wherein said distinct segments of said fiber dissociate in less than about 30 seconds when contacted with a hot aqueous fibrillation-inducing medium.

25. The splittable conjugate fiber of claim 24 wherein said conjugate fiber comprises two polymers selected from polyolefin-polyamide, polyolefin-polyester and polyamide-polyester pairs.

26. A process for producing split fibers, which comprises the steps of:
   a) providing conjugate fibers comprising at least two incompatible thermoplastic polymer components which form a multitude of distinct cross-sectional segments along the length of said fibers and which have a solubility parameter difference of at least about 0.5 $(cal/cm^3)^{1/2}$, and
   b) contacting said conjugate fibers with a hot aqueous split-inducing medium to split said conjugate fibers, thereby forming split fibers, wherein at least one of said polymer components is naturally hydrophilic or hydrophilically modified, said segments have an unocclusive configuration such that said segments are dissociable, and said segments dissociate in less than about 30 seconds when contacted with said hot aqueous split-inducing medium.

27. The process for producing split fibers of claim 26 wherein said hydrophilic polymer is a copolymer of caprolactam and alkylene oxide diamine.

28. The process for producing split fibers of claim 26 wherein said incompatible polymer components comprise a first polymer composition, which comprises a first thermoplastic polymer, and a second polymer composition, which comprises a second thermoplastic polymer; and said first and second polymers are selected from polyolefin-polyamide, polyolefin-polyester and polyamide-polyester pairs.

29. The process for producing split fibers of claim 28 wherein said hydrophilic polymer is hydrophilically modified and said hydrophilic modifier is a surfactant.

30. The process for producing split fibers of claim 28 wherein said hydrophilic component has a contact angle equal to or less than about 80°.

31. The process for producing split fibers of claim 30 wherein at least one of said first and second polymer compositions contains a surfactant between about 0.1% and about 5% based on the total weight of said polymer composition.

32. The process for producing split fibers of claim 26 wherein said incompatible polymers are immiscible.

33. The process for producing split fibers of claim 26 wherein said hot fibrillation-inducing medium is water or steam having a temperature of at least about 60° C.

34. A fabric comprising split fibers produced with the process of claim 28.

* * * * *